United States Patent [19]
Hush

[11] Patent Number: 5,635,988
[45] Date of Patent: Jun. 3, 1997

[54] APPARATUS AND METHOD FOR MAINTAINING SYNCHRONISM BETWEEN A PICTURE SIGNAL AND A MATRIX SCANNED ARRAY

[75] Inventor: Glen E. Hush, Boise, Id.

[73] Assignee: Micron Display Technology, Inc., Boise, Id.

[21] Appl. No.: 518,675

[22] Filed: Aug. 24, 1995

[51] Int. Cl.$^6$ ............................................. H04N 5/10
[52] U.S. Cl. ..................... 348/500; 348/800; 348/521; 348/510; 348/523
[58] Field of Search .................... 348/800–803, 348/497–500, 510, 548, 525, 533, 523, 529, 513, 545, 547, 512, 521; 345/213

[56] References Cited

U.S. PATENT DOCUMENTS

| | | | |
|---|---|---|---|
| 4,238,770 | 12/1980 | Kobayashi et al. | 358/154 |
| 4,511,926 | 4/1985 | Crossland et al. | 358/236 |
| 4,616,259 | 10/1986 | Moran et al. | 358/148 |
| 4,748,510 | 5/1988 | Umezawa | 358/236 |
| 5,129,850 | 7/1992 | Kane et al. | 445/24 |
| 5,132,794 | 7/1992 | Okada et al. | 358/153 |
| 5,153,574 | 10/1992 | Kondo | 345/186 |
| 5,189,515 | 2/1993 | Chen | 358/157 |
| 5,212,426 | 5/1993 | Kane | 315/169.1 |
| 5,245,431 | 9/1993 | Okada et al. | 358/154 |
| 5,303,046 | 4/1994 | Masuda | 348/500 |
| 5,359,256 | 10/1994 | Gray | 313/169 |

*Primary Examiner*—Glenton B. Burgess
*Attorney, Agent, or Firm*—Seed and Berry LLP

[57] ABSTRACT

A monolithically integratable display apparatus for receiving a picture signal having frames of video information and horizontal and vertical synchronizing components includes a matrix of display cells arranged in an array of M rows by N columns. Display cells in the matrix are individually addressable by row and column signals so as to receive the video information in the picture signal in response thereto. A first shift circuit coupled to the matrix provides the row signals in response to a first clocking signal and a data signal. A second shift circuit coupled to the matrix provides the column signals in response to a second clocking signal. A first clock circuit, such as a phase locked loop, receives the horizontal synchronizing component of the picture signal and produces the second clocking signal in response thereto. A synchronizing detector circuit receives the vertical synchronizing component of the picture signal and produces the data signal in response thereto. A synchronizing regenerator circuit provides a substitute data signal if it fails to receive the data signal, the substitute data signal being based on a vertical synchronizing component from a previous frame of video information.

24 Claims, 4 Drawing Sheets

Fig. 2

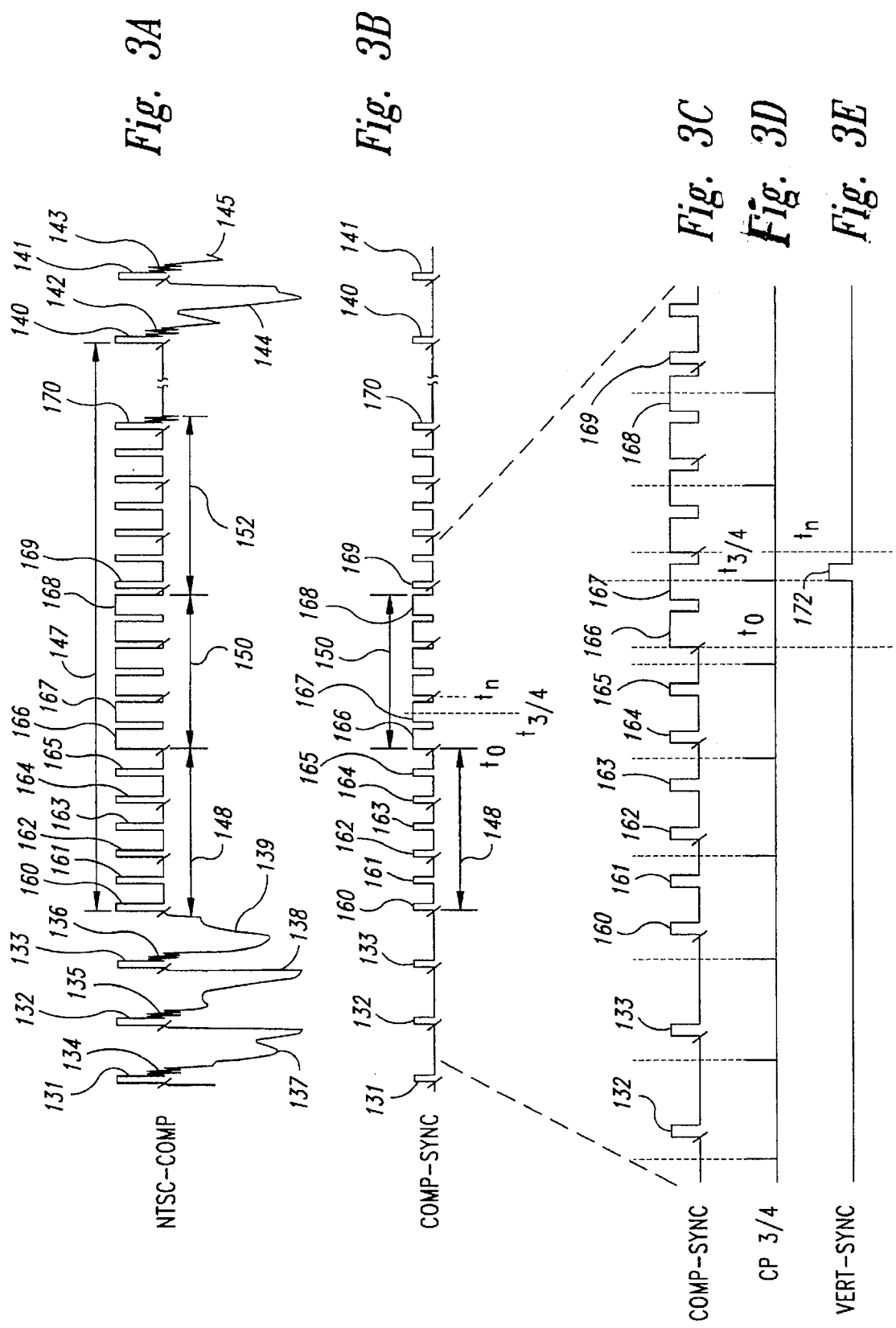

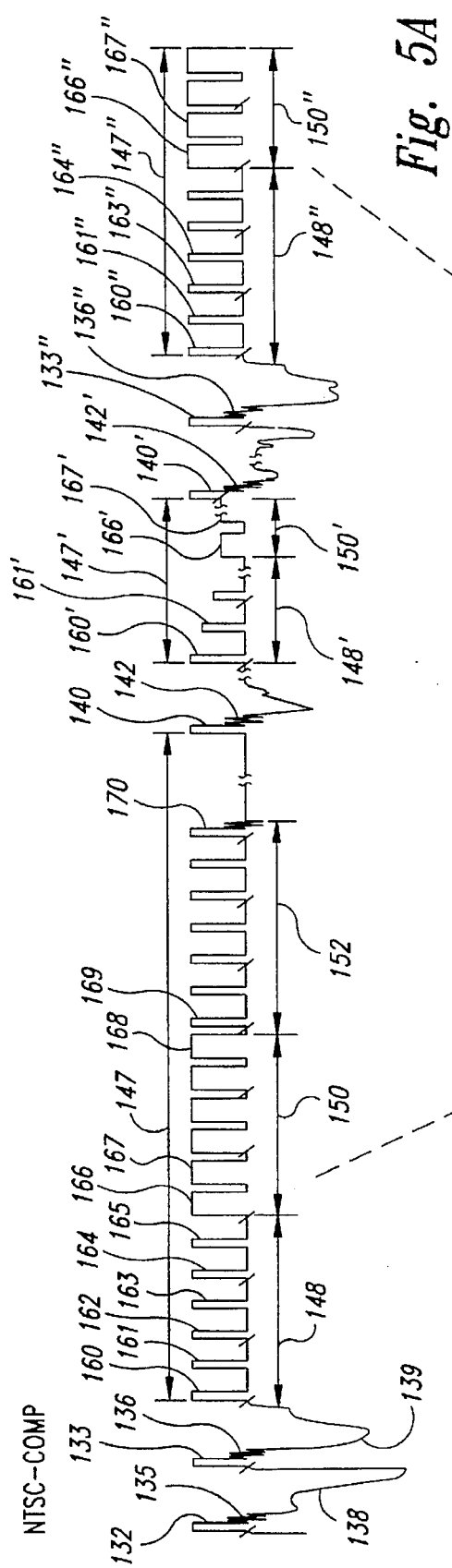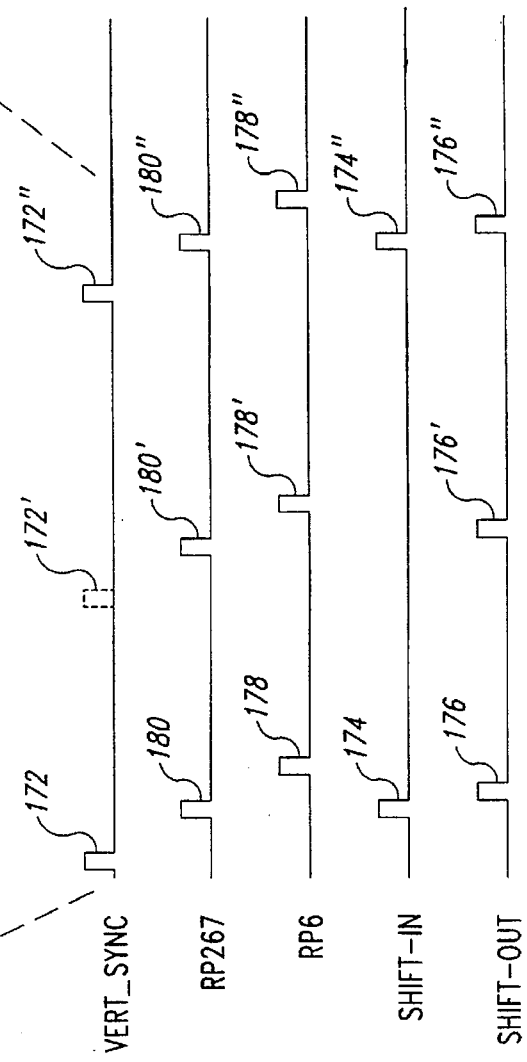

APPARATUS AND METHOD FOR MAINTAINING SYNCHRONISM BETWEEN A PICTURE SIGNAL AND A MATRIX SCANNED ARRAY

This invention was made with Government support under Contract No. DABT63-93-C-0025 awarded by Advanced Research Projects Agency (ARPA). The Government has certain rights in this invention.

TECHNICAL FIELD

This invention relates to visual display systems, and more particularly to systems for maintaining synchronization between picture signals and visual display devices.

BACKGROUND OF THE INVENTION

Current visual display devices such as televisions typically employ cathode ray tubes ("CRTs"). Most televisions are driven by an analog video signal, which in North America, is governed by the NTSC standard. The standard NTSC signal, and other standard television signals, include both video and synchronizing ("sync") signals. In a color television signal, the video signals include luminance (e.g., intensity) and chrominance (e.g., color) information. The sync signal includes horizontal and vertical synching pulses, and horizontal and vertical blanking intervals. The horizontal synching pulses synchronize the horizontal sweep of the CRT's scanning electron gun with the source that produced the NTSC signal. Similarly, the vertical synching pulses synchronize fields or frames of displayed information on the CRT.

The horizontal blanking interval is a period that compensates for the time required for the electron gun to return from the right-hand side back to the left-hand side of the screen between the display of adjacent lines on the CRT. Likewise, the vertical blanking interval is a period that compensates for the time required for the electron gun to return from the bottom to the top of the screen between the display of consecutive frames. Well-known circuitry coupled to the CRT synchronizes and drives the electron gun in response to the video and synchronizing signals of the television signal to produce a coherent picture.

CRTs, however, are bulky, heavy, and consume significant amounts of power. Therefore, alternative displays have been developed such as liquid crystal displays ("LCDs") and electroluminescent displays. Such displays are typically referred to as "matrix displays" because they include an M row by N column matrix of display cells or "pixels".

In active matrix displays, such as LCDs, each display cell includes at least one switch driven by a pointer signal that enables the video signal to drive the display cell in the LCD. Typical LCDs can employ one million pixels arranged in one thousand rows by one thousand columns. Therefore, many thousands of pointer signals are required to address each display cell in such an LCD.

Unfortunately, LCDs require thousands of interconnections between the display cells and external circuitry that provide the pointer signals. Since LCDs typically cannot be manufactured using standard integrated circuit packaging techniques, such displays are expensive to manufacture due to the thousands of interconnections required. While the manufacture of LCDs has recently become more economical, such displays are, however, still slow and dim compared to CRTs. Electroluminescent displays are quicker and brighter than LCDs, but are considerably more expensive to manufacture.

As noted above, individual display cells in the matrix are individually addressed by means of pointer signals. Typically, a given row is first addressed by a row pointer signal, and then each column is serially addressed by column pointer signals as luminance and chrominance data is provided to each display cell in the row. Such row and column addressing of display cells in the matrix display is similar to the addressing of memory cells in a semiconductor memory device. Therefore, typical computer generated signals are readily adapted for addressing and providing video signals to matrix displays. Matrix displays, however, cannot readily receive television signals such as standard NTSC television signals. Auxiliary circuitry is required to convert the horizontal and vertical synching pulses into clocking and addressing signals for addressing and writing data to each display cell in the matrix array.

If LCDs could be efficiently manufactured using standard integrated circuit manufacturing techniques, then it would be economical to monolithically integrate the LCD onto a single substrate with the auxiliary circuitry or synchronizing and clocking circuitry necessary for converting an NTSC signal into a signal appropriate for addressing the LCD. In addition to the difficulty in manufacturing LCDs under standard integrated circuit manufacturing techniques, however, conventional synchronization and clocking circuitry requires considerable area on a semiconductor substrate and consumes excessive power. Therefore, if manufacturing techniques improve, such circuitry could not likely be integrated with an LCD or other matrix displays on a single substrate. In addition to consuming significant area on a semiconductor substrate, typical synchronizing and clocking circuitry employed by televisions is complex. Therefore, such synchronizing and clocking circuitry would increase the complexity, and therefore the cost, of the LCD or other matrix display.

SUMMARY OF THE INVENTION

The present invention employs circuitry required to operate a matrix display to also provide synchronizing and clocking functions. As a result, such circuitry, currently monolithically integrated with certain matrix displays, can be employed to perform clocking and synchronizing functions, in conjunction with a minimum of additional circuitry, so as to allow the display of television signals.

In a broad sense, the present invention embodies a display system for receiving a picture signal having frames, each frame being composed of a plurality of lines, each line having either video information and a first synchronizing component, or a second synchronizing component, the second synchronizing component occurring at a predetermined time during the line and indicating the beginning of a frame. The display system includes a matrix of display cells arranged in an array having a plurality of rows and at least one column, the display cells being individually addressable by row signals to receive the video information and the picture signal in response thereto. A pointer device provides the row signals in response to a data signal, and generates a start pointer signal at the predetermined time interval during each line. The pointer device also stores a carryover pointer signal indicating the beginning of a previous line.

A synchronizing detector has a memory circuit and an analysis circuit. The memory circuit is coupled to the pointer device and receives the picture signal. The memory circuit stores a plurality of samples of each line of the picture signal after receiving the start pointer signal. The samples of each line contain either the video information or the second synchronizing component. The samples of the second synchronizing component have a predetermined value. The analysis circuit is coupled to the memory circuit and outputs the samples of the picture signal as the second synchronizing component if the samples have substantially the same predetermined value.

A second synchronizing regenerator circuit is coupled to the synchronizing detector and to the pointer device. The synchronizing regenerator circuit receives the second synchronizing component and outputs a current second synchronizing component as the data signal to the pointer circuit if a current frame contains the current second synchronizing component. Otherwise, the synchronizing regenerator circuit outputs the carryover pointer signal as a substitute data signal if the current frame fails to contain the current second synchronizing component.

The present invention also embodies a display apparatus for receiving a television signal having frames of video information and corresponding first and second synchronizing components. The display apparatus includes a semiconductor substrate and a matrix of field emission display cells formed on the semiconductor substrate. The matrix of field emission display cells are arranged in an array of M rows by N columns. The field emission display cells are individually addressable by M number of row signals and N number of column signals to selectively receive the video information of the television signals in response thereto.

First and second shift circuits are formed on the semiconductor substrate and are coupled to the matrix of field emission display cells. The first shift circuit sequentially provides the M row signals in response to a first clocking signal, and the second shift circuit sequentially provides the N column signals in response to a second clocking signal. The second clocking signal has a second frequency higher than a first frequency of the first clocking signal. A first clock circuit is formed on the semiconductor substrate and is coupled to the second shift circuit. The first clock circuit receives the first synchronizing component of the television signal and produces the second clocking signal in response thereto.

A synchronizing detector circuit is also formed on the semiconductor substrate and is coupled to the first shift circuit. The synchronizing detector circuit receives the second synchronizing component of the television signal for a current frame of video information and produces the data signal in response thereto. A synchronizing regenerator circuit is formed on the semiconductor substrate and is coupled to the synchronizing detector and first shift circuits. The synchronizing regenerator circuit provides a substitute data signal if the synchronizing regenerator circuit fails to receive the data signal. The substitute data signal is based on a previous data signal for a previous frame of video information in the television signal.

The present invention furthermore embodies a method of displaying information based on a picture signal having frames of video information and corresponding first and second synchronizing components. The method includes the steps of: (i) providing a matrix of display cells arranged in an array having a plurality of rows and a plurality of columns, the display cells are individually addressable by row and column signals so as to receive the video information in the picture signal in response thereto; (ii) producing first and second clocking signals in response to the first synchronizing component, the second clocking signal having a frequency greater than a frequency of the first clocking signal; (iii) detecting the second synchronizing component in the picture signal; (iv) producing a data signal based on the second synchronizing component; (v) providing a current frame of video information to the matrix of display cells; (vi) receiving the data signal; (vii) producing the row of signals at a rate equal to the frequency of the first clocking signal to sequentially enable rows of display cells in the matrix of display cells after receiving the data signal; (vii) producing a substitute data signal based on a second synchronizing component from a previous frame of video information if the data signal is not received; and (ix) producing the column signals at a rate equal to the first clocking signal to sequentially enable display cells in a given row to display information based on the video signal.

The present invention solves problems inherent in the prior art by providing a vertical sync detection and regeneration system capable of being efficiently monolithically integrated with a scanned matrix display, preferably a field emission display ("FED"). Various features and advantages of the present invention will become apparent to those skilled in the art from studying the following detailed description of the presently preferred embodiments, together with the following drawings.

BRIEF DESCRIPTION OF THE DRAWINGS

FIG. 3A is a waveform diagram of a typical NTSC composite television signal.

FIG. 3B is a waveform diagram of a composite sync signal derived from the NTSC composite signal of FIG. 3A.

FIG. 3C is an enlarged waveform diagram of a portion of the composite sync signal of FIG. 3B.

FIG. 3D is a waveform diagram of pointer signal $CP_{3/4}$ that initiates vertical sync detection in the composite sync signal of FIG. 3C by a vertical sync detector of the display device of FIG. 2.

FIG. 3E is a waveform diagram showing a vertical sync signal produced from the composite sync signal of FIG. 3C by the vertical sync detector of FIG. 2.

FIG. 5A is a waveform diagram of the NTSC composite signal of FIG. 3A, showing portions of three consecutive frames of sync information.

FIG. 5B is a waveform diagram of a vertical sync signal as generated by the vertical sync detector of FIG. 2 based on the NTSC composite signal of FIG. 5A.

FIG. 5C is a waveform diagram of row pointer signals RP267 generated by a column pointer of the display device of FIG. 2.

FIG. 5D is a waveform diagram of row pointer signal RP6 generated by the column pointer of FIG. 2.

FIG. 5E is a waveform diagram of a Shift_In signal produced by the row pointer of FIG. 2 and input to the horizontal sync detector.

FIG. 5F is a waveform diagram of a Shift_Out signal produced by a vertical sync regenerator of the display device of FIG. 2, and input to the row pointer.

DETAILED DESCRIPTION OF THE PRESENTLY PREFERRED EMBODIMENTS

Figure 1:
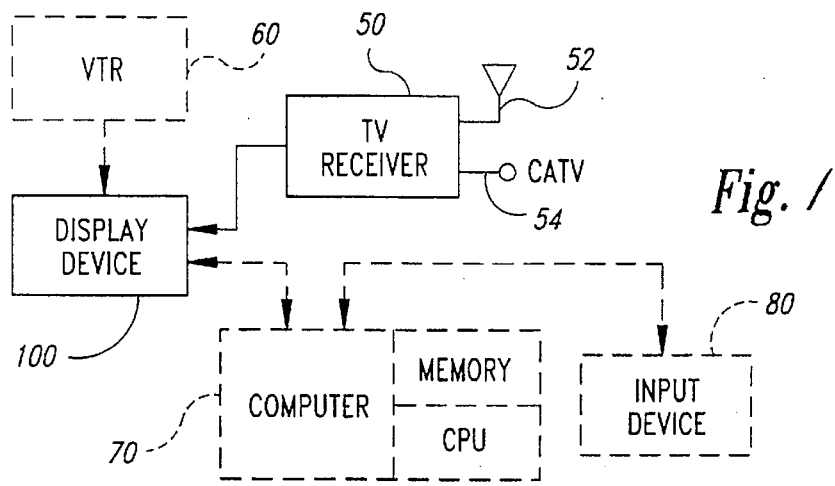
FIG. 1 is a block diagram of exemplary systems employing a display device of the present invention.

Referring to FIG. 1, a scanned matrix display device 100 of the present invention is adaptable for providing visual information in various display systems, for example, in a television when coupled to a television receiver 50. The television receiver 50 receives a standard television or picture signal, such as an NTSC, PAL, SECAM, or other typically broadcast television signal by means of an antenna 52. Alternatively, the television receiver 50 can receive the standard television or a cable television signal by means of a cable 54.

Alternatively, the display device 100 can be employed in a view finder of a video camera (not shown). The display device 100 can also receive a picture signal from a videotape recorder ("VTR") 60. The display device 100 of the present invention can also be coupled to a computer 70 having a memory, a microcontroller or central processing unit ("CPU") and an input device 80 (such as a keypad or keyboard). The display device 100 can be incorporated into a user wearable head-mounted device ("HMD") that is coupled to the television receiver 50, videotape recorder 60 or computer 70. The display systems into which the display device 100 is incorporated can also include additional circuitry and features, not described herein, such as audio receivers and speakers, or frames for removably mounting the display device in front of a viewer's eyes as in an HMD.

Figure 2:
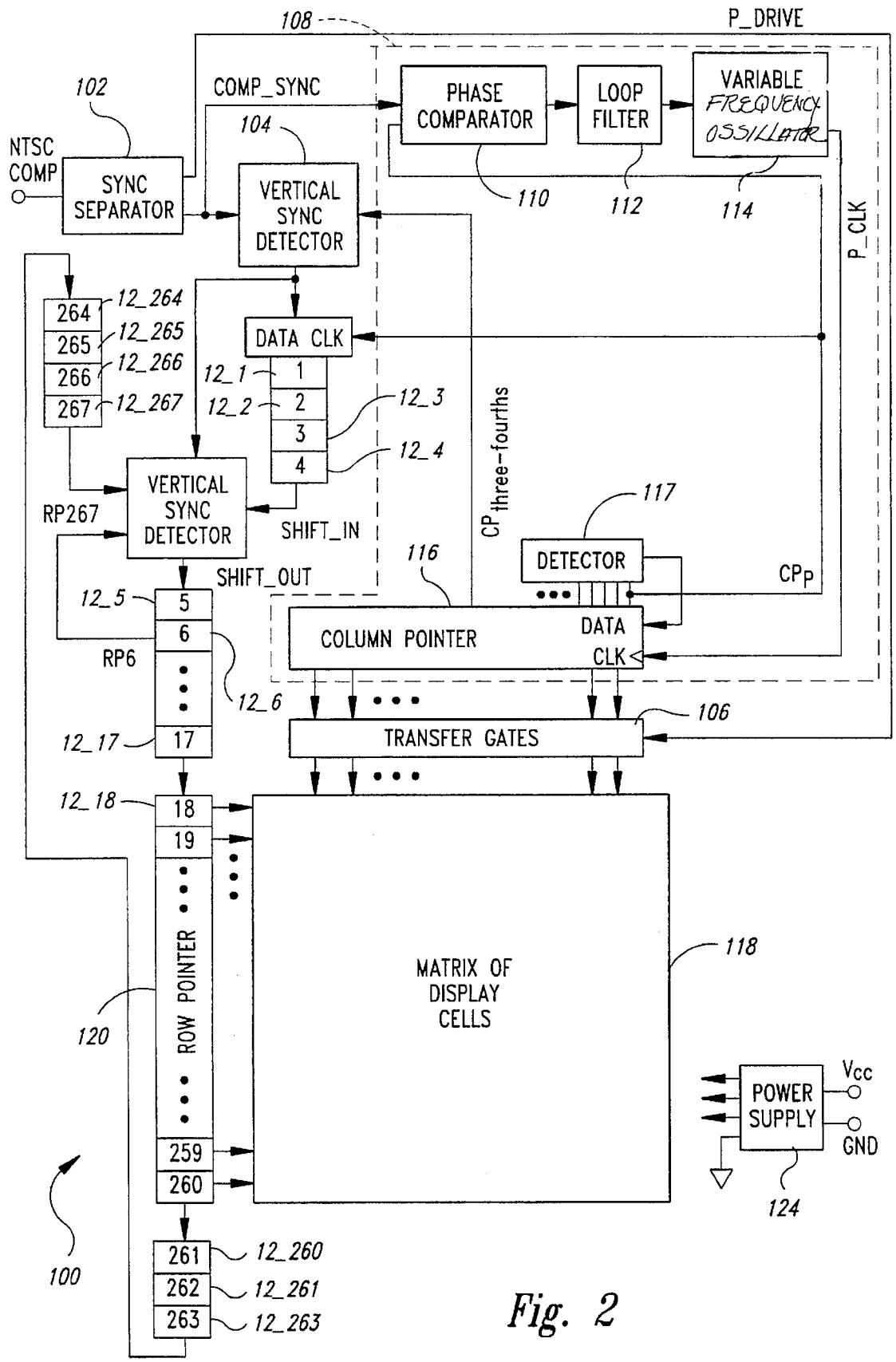
FIG. 2 is a block diagram of the display device of FIG. 1.

The display device 100 is preferably monolithically integrated with various circuitry, as shown in FIG. 2. A sync separator 102 receives a composite video/sync signal such as an NTSC signal ("NTSC_Comp"). The sync separator 102 strips the composite sync information ("Comp_Sync") from the video information or analog drive signal ("P_DRIVE") in the NTSC composite signal NTSC_Comp. The display device 100 is generally described herein as a monochrome display, and therefore, the analog drive signal P_DRIVE provides only luminance information, i.e., brightness, for each picture element in the display device, as described below. However, for display of a color picture, the sync separator 102 can instead be replaced by a color sync separator with RGB decoder that provides the P_DRIVE signal having both luminance and chrominance information for each picture element.

A vertical sync detector 104 and phase lock loop 108 receive the composite sync signal Comp_Sync, while a transfer gate circuit 106 receives the analog drive signal P_DRIVE. The phase locked loop circuit 108 includes a phase comparator 110, a loop filter 112, and a variable frequency oscillator 114. The phase comparator 110 compares the composite sync signal Comp_Sync to a final column pointer signal CPp, as described in more detail below.

Using known circuits and techniques, the phase comparator 110 produces an error signal that is filtered by the loop filter 112 and input to the variable frequency oscillator 114 to generate a clock signal P_CLK. The clock signal P_CLK is input to a clock terminal CLK of the column pointer 116. The column pointer 116 is preferably a shift circuit that shifts a pattern of "high" and "low" values at a rate equal to the clock signal P_CLK and provides column pointer signals in response thereto. The column pointer 116 of FIG. 2 includes a number of stages, 0 through p. In response to a single "high" value pulse that is shifted through the p stages of the column pointer 116, a "walking 1" pattern results whereby column pointer signals CP0 through CPp are output therefrom. Except for several column pointer signals generated at the beginning and end of the column pointer 116, all of the column pointer signals are input to the transfer gates 106 and serially switch the analog drive signal P_DRIVE to individual picture elements or display cells along a given row of display cells in a matrix of display cells 118.

A row pointer 120 serially provides row pointer signals to the matrix of display cells 118 to enable a given row in the matrix of display cells. To assist in describing the present invention, the row pointer 120 of FIG. 2 is broken into five portions: stages 1–4, numbered 12_1 through 12_4; stages 5–17, numbered 12_5 through 12_17; stages 18–260, numbered 12_18 through 12_260; stages 261 through 263, numbered 12_261 through 12_263; and stages 264 through 267, numbered 12_264 through 12_267, all respectively. The last column pointer signal CPp provides a clock signal to a clock terminal CLK of the row pointer 120 to establish the rate at which the single "high" value pulse is shifted through stages 12–1 through 12–267 of the pointer, as described below.

In a preferred embodiment, for the NTSC composite signal NTSC_Comp, the matrix of display cells 118 has 263 rows of display cells and the row pointer 120 provides at least 263 row pointer signals. The column pointer 116 preferably has a length equal to each horizontal line in the NTSC composite signal NTSC_Comp, based on a given clock rate P_CLK for the pointer. The column and row pointers 116 and 120 can be constructed from any of several known circuits, such as shift registers, counter/decoders or charge coupled devices ("CCD").

The vertical sync detector 104 provides a vertical sync input signal Vert_Sync to a data terminal of the row pointer 120 and to a vertical sync regenerator 119, while a detector 117 provides an input signal to the data terminal of the column pointer 116, as will be described more fully below. A power supply 124 receives direct current via terminals $V_{cc}$ and GND, and using conventional circuit techniques, provides regulated and current limited DC voltages to circuits in the display device 100.

The matrix of display cells 118 embodies a matrix of M rows by N columns of light-emitting diodes, liquid crystal shutters, electroluminescent devices, or equivalent conventional display cell devices. In a preferred embodiment, the matrix of display cells 118 form a field emission display ("FED") where each display cell includes a tip for field emission toward a phosphorescent target, as is described in, for example, U.S. Pat. No. 5,212,426, entitled INTEGRALLY CONTROLLED FIELD EMISSION FLAT DISPLAY DEVICE, and U.S. Pat. No. 5,359,256, entitled REGULATABLE FIELD EMITTER DEVICE AND METHOD OF PRODUCTION THEREOF. The matrix of display cells 118 is preferably an FED because an FED can be currently integrated using semiconductor processing techniques, and therefore, the display device 100 of the present invention can be monolithically integrated as a single chip.

The column pointer 116 operates at a faster clock rate than the row pointer 120 because all of the picture elements in each row must be selected by the column pointer 116 before the row pointer 120 selects the next row. For example, if the matrix of display cells 118 is an array of 500×500 display cells, and an NTSC composite signal is used to drive the display device 100, then the column pointer 116 would enable all of the display cells along a row in about 53.2 microseconds, while the row pointer would enable every row in the matrix in about 16,667 microseconds (since the NTSC signal employs interleaved frames). The P_CLK signal provides the rate at which the column pointer 116 enables all of the display cells along a given row, while the last column pointer signal CPp provides the rate at which the row pointer 120 enables rows in the matrix of display cells 118. The frequency of the last column pointer signal CPp is equal to the time to enable one row, times the number of rows, while the P_CLK signal is equal to the frequency of the CPp signal times the number of columns in each row. Therefore, if the present invention employs the NTSC composite signal to drive the display device 100, then. The P_CLK signal clocking the column pointer 116 is about 500 times faster than the CPp signal clocking the row pointer 120.

The row and column pointers 116 and 120 require two input signals to correctly apply the analog drive signal P_DRIVE to the matrix of display cells 118 so that a synchronized and unscrambled video signal is displayed therefrom. The NTSC composite signal NTSC_Comp conveys video information regarding one pixel at any instant in time in a predetermined scanning order, where pixels for a picture are described in left-to-right column order as horizontal lines and in top-to-bottom row order as frames for the picture. The NTSC composite signal NTSC_Comp provides interleaved frames one after another for rapid flicker-free display of moving pictures. Thus, the display device 100 must maintain synchronization with the NTSC composite signal NTSC_Comp so that the top-left display cell in the matrix of display cells 118 receives the appropriate video information from the NTSC_Comp signal regarding the top-left pixel of the picture to be displayed, and so forth. As explained more fully below, the composite sync signal Comp_Sync in the NTSC composite signal NTSC_Comp is used to properly synchronize application of the video information in the NTSC_Comp signal to the matrix of display cells 118 so as to produce a coherent picture.

The first required input signal to the row and column pointers 116 and 120 is a "data signal," which is a "high" or logical "1" pulse that must be input to the column pointer 116 at the beginning of each horizontal line of video data in the NTSC composite signal NTSC_Comp, and to the row pointer 120 at the beginning of each frame of video data. The second required input signals, or "clock signals" (P_CLK and CPp), are input to the CLK terminals of the column and row pointers 116 and 120, respectively. The clock signals P_CLK and CPp must have an appropriate frequency to shift or step the initial "high" value pulse through the pointers for each pixel in a line of video for the column pointer 116, and for each line in a frame for the row pointer 120, respectively. If any of these input signals are not synchronized with the NTSC composite signal NTSC_Comp, the matrix of display cells 118 will not produce a coherent video picture. The circuitry in the display device 100 for generating the data and clock input signals for the column and row pointers 116 and 120 will now be described.

Considering first the data signal input to the column pointer 116 and the clock signal CPp input to the CLK terminal of the row pointer 120, an understanding of the NTSC composite signal is helpful. Referring to the typical NTSC composite signal NTSC_Comp shown in FIG. 3A, the left-hand side of the NTSC_Comp signal shows the last three horizontal lines of video data from a frame ("horizontal lines"). The last three horizontal lines of the NTSC composite signal NTSC_Comp correspond to the bottom three rows for the matrix of display cells 118, and each of the horizontal lines begins with a horizontal sync pulse 131, 132 or 133. The equivalent of each horizontal line in the NTSC composite signal NTSC_Comp (and in the other waveforms) is indicated by a diagonal hash mark extending through the waveform that marks the end of one horizontal line and the beginning of the next line.

Color bursts 134, 135 and 136 of chrominance information and an analog signal containing luminance information 137, 138 and 139 follow the horizontal sync pulses 131, 132 and 133, all respectively. For a monochrome display, the color bursts 134, 135 and 136 are ignored. The right-hand side of the NTSC composite signal NTSC_Comp shows the top two lines of video for a subsequent frame, having horizontal sync pulses 140 and 141, color bursts 142 and 143, and luminance information 144 and 145, all respectively. Between the end of the last horizontal line of video of one frame and the first horizontal line of video for the subsequent frame, a vertical blanking interval 147 exists consisting of a pre-equalizing pulse interval 148 having pulses 160 through 165, a vertical sync pulse interval 150 having pulses 166 through 168, and a post-equalizing pulse interval 152 having pulses 169 through 170.

As can be seen from the NTSC composite signal NTSC_Comp of FIG. 3A, each horizontal line includes not only the luminance information (e.g., 137, 138 or 139), but also additional information such as the horizontal sync pulses (e.g., 131, 132 or 133), and color bursts (e.g., 134, 135 or 136), equalizing pulses (e.g., 160–165) and vertical sync pulses (e.g., 166–168). The pulses, and sometimes the color bursts, in the NTSC composite signal NTSC_Comp can be considered overhead, since they contain no video information to be scanned into the matrix of display cells 118. Therefore, to compensate for such overhead within horizontal lines in the NTSC composite signal NTSC_Comp, the column pointer 116 includes pre- and post-buffers or additional stages at the beginning and end of the column pointer that do not provide column pointer signals to the transfer gates 106. Similarly, to compensate for overhead between horizontal lines in the NTSC composite signal NTSC_Comp, the row pointer 120 includes pre-and post-buffers, or additional stages 12_1 through 12_17 and 12_261 through 12_263 that do not provide row pointer signals to the matrix of display cells 118. As a result, stages 12_1 through 12_263 represent a full frame including overhead.

For the data input to the column pointer 116, only one "high" value must be provided to the data terminal at the beginning of each horizontal line, as noted above. While a shift register can be used, a simpler method employs an N input NOR gate or detector 117, that receives all of the column pointer signals CP0–CPp from the column pointer 116. When all of the column pointer signals have a "low" value, indicating that the single "high" value pulse has been shifted through all stages of the column pointer, then the detector 117 inputs a single "high" value to the data terminal of the column pointer. The new "high" value pulse indicates the beginning of a new horizontal line, and is shifted through the stages 0 through p of the column pointer 116 for the new horizontal line. The detector 117 is described in more detail in the inventor's previous U.S. patent application Ser. No. 372,413, filed Jan. 13, 1995, entitled TIMING CONTROL FOR A MATRIXED SCANNED ARRAY.

Similarly, for the clock input to the row pointer 120, only one "high" value must be provided to the clock terminal CLK at the beginning of each horizontal line. Since only one "high" value pulse is shifted through the column pointer 116, the last column pointer signal CPp can be used to indicate the end of one horizontal line and the beginning of the next horizontal line. Therefore, the last column pointer signal CPp from the column pointer 116 is input to the clock terminal CLK of the row pointer 120 to provide the rate at which the single "high" value pulse is shifted through all stages 12–1 through 12–267 of the row pointer.

Considering now the clock input signal P_CLK for the column pointer 116, the phase locked loop 108 produces the P_CLK signal as having a single frequency that is faster than the horizontal sync pulse rate in the composite sync signal Comp_Sync. The phase comparator 110 compares the frequency of the horizontal sync signal HORZ_SYNC to the last column pointer signal CPp to generate a DC output error signal that is an average of or proportional to the phase difference between the frequencies of the two input signals. The loop filter 112 filters any high-frequency components in the DC signal to leave only the average in the error signal. The variable frequency oscillator 114 produces an output frequency signal, the P_CLK signal, that is directly proportional to the error signal, with the phase locked loop 108 overall having high gain. As a result, the phase locked loop 108 produces the output signal P_CLK having a frequency higher than the frequency of the last column pointer signal CPp but which is in phase with the CPp signal. While a separate counter can be used to lock the phase locked loop 108, since only one "high" value pulse is shifted through the column pointer 116, the last column pointer signal CPp also can be used as an input to the phase comparator 110 provide N column pointer signals for each horizontal sync pulse in the composite sync signal Comp_Sync, and maintain synchronism with the pulses so that the first display cell in each row receives the first pixel of video information in a line of video. As a result, the column pointer 116 not only provides the pointer signals to the matrix of display cells 118, and the clock signal CPp to the row pointer 120, but also provides a comparison signal to the phase comparator 110.

To help ensure that the phase locked loop circuit 108 does not lose lock with the horizontal sync pulses of the incoming composite sync signal Comp_Sync, the present invention can employ circuitry (not shown) to disable the phase locked loop circuitry during the vertical blanking interval 147. Such circuitry is described in the above-referenced application, which disables the phase detector 110 during the vertical blanking interval 147 so that the equalization pulses 160–168 do not cause the phase locked loop 108 to lose lock during this interval.

Considering now the data signal input to the row pointer 120, the data signal must have a frequency equal to, and be in sync with, the rate of the frames so that the data signal has a "high" value at the beginning (or end) of each frame of video data. The vertical blanking interval 147 provides such a signal to synchronizing circuitry in standard televisions. Therefore, the vertical blanking interval 147 provides an ideal source from which to generate the data signal for the row pointer 120 in the display device 100.

The vertical blanking interval 147 is at most times high during the vertical sync pulse interval 150, while at most times low during the pre-and post-equalizing pulse intervals 148 and 152. At three quarters of the way through a horizontal line, the composite sync signal Comp_Sync has a "low value," except for the vertical sync pulse interval 150, which has a "high" value at a time three quarters of the way through a horizontal line. To determine when the vertical sync pulse interval 150 occurs in the composite sync signal Comp_Sync, and thus to determine the end of one frame and the beginning of the next frame, the vertical sync detector 104 examines the Comp_Sync signal at a time approximately three-quarters of the way through each horizontal line to determine if it corresponds to a "high" value. The column pointer 116 outputs the column pointer signal $CP_{3/4}$ to the vertical sync detector 104 (FIG. 2) to indicate a time three-quarters of the way through a horizontal line (row) at which the detector is to examine the composite sync signal Comp_Sync.

To ensure that the high value occurring three-quarters of the way through a given horizontal line corresponds to a vertical sync pulse, the vertical sync detector 104 continues to examine the composite sync signal Comp_Sync to determine if at least a second "high" value follows the initial "high" value. Therefore, the vertical sync detector 104 determines if several consecutive "high" values occur in the composite sync signal Comp_Sync following receipt of the column pointer signal $CP_{3/4}$.

Referring to FIGS. 3A through 3E, the sync separator 102 trips out the horizontal synching pulses (e.g., 131, 132 and 133) and the pulses in the vertical blanking interval 147 from the NTSC composite signal NTSC_Comp (FIG. 3A), to produce the composite sync signal Comp_Sync (FIGS. 3B and 3C), and provides the Comp_Sync signal to the vertical sync detector 104. FIG. 3C shows an exemplary horizontal line extending from time $t_0$ to $t_n$. At a time $t_{3/4}$ three-quarters of the way through the horizontal line, the composite sync signal Comp_Sync has a "high" value, represented by vertical sync pulse 167. At time $t_{3/4}$, the column pointer 116 outputs the column pointer signal $CP_{3/4}$, as shown in FIG. 3D. In response thereto, the vertical sync detector 104 confirms that three consecutive "high" values occur after time $t_{3/4}$. If so, then the vertical sync detector 104 inputs a "high" value pulse 172 (FIG. 3E) to the data terminal of the row pointer 120, causing the pointer to begin sequential initialization of rows in the matrix of display cells 118 for a new frame of video.

Figure 4:
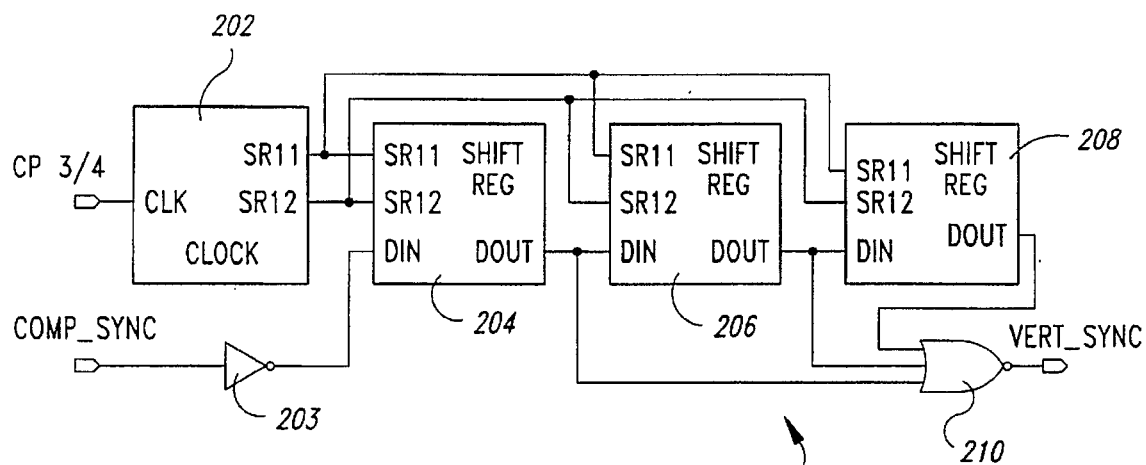
FIG. 4 is a schematic diagram of the vertical sync detector of FIG. 2.

Referring to FIG. 4, an exemplary circuit for implementing the vertical sync detector 104 shown as employing a clock 202 that provides clock signals SR11 and its compliment SR12 to a three stage shift register having stages 204, 206, and 208. The composite sync signal Comp_Sync is inverted by an inverter 203 and input to a data input terminal DIN of the first shift register stage 204. The clock circuit 204 receives the column pointer signal $CP_{3/4}$, which resets and initiates the clock, causing the three stages of the shift register 204, 206, and 208 to serially shift the composite signal Comp_Sync therethrough at the clock rate. Data outputs DOUT of the shift register stages 204, 206, and 208 are coupled to the inputs of a pass gate or NOR gate 210.

In operation, when the clock 202 receives the column pointer signal $CP_{3/4}$ from the column pointer 116, the clock begins by shifting a first sample of the inverted composite sync signal Comp_Sync into the data input terminal DIN of the first shift register stage 204. After a second clock pulse, the clock 202 causes a second sample of the inverted composite sync signal Comp_Sync to be input to the data input terminal DIN of the first shift register stage 204, while the first sample is shifted from the data output terminal DOUT of the first stage to the data input terminal DIN of the second shift register stage 206. Thereafter, on a third clock pulse, the clock 202 causes a third sample of the inverted composite sync signal Comp_Sync to be input to the data input terminal DIN of the first shift register stage 204, the second sample to be shifted to the second shift register stage 206, and the first sample to be shifted to the third shift register stage 208. On a final clock pulse, the first, second, and third samples from the third, second, and first shift register stages 208, 206, and 204, respectively, are output to the NOR gate 210.

If all three samples of the composite sync signal Comp_Sync have a "high" value, which are inverted by the inverter 203 to a "low" value, then the NOR gate 210 outputs a "high" value as a vertical sync pulse, such as the pulse 172 in the vertical sync signal Vert_Sync. If any one of the stages of the shift register fail to output a "low" value, indicating an invalid vertical sync pulse in the composite sync signal Comp_Sync, then the NOR gate 210 does not output a "high" value. Thereafter, the clock 202 sets, awaiting the next column pointer signal $CP_{3/4}$.

Before and soon after receiving the pointer signal $CP_{3/4}$ (about four clock pulses after), the vertical sync detector 104 ignores the composite sync signal Comp_Sync and the NOR gate 210 forces the vertical sync signal Vert_Sync signal to a "low" value. As a result, the vertical sync detector 104 passes only the vertical sync pulses in the composite sync signal Comp_Sync, as shown in FIG. 3E. Additionally, the vertical sync detector 104 filters any noise in the composite sync signal Comp_Sync before and after soon receiving the pointer signal $CP_{3/4}$, thereby avoiding a noise pulse being confused as a vertical sync pulse.

While the vertical sync detector 104 accurately filters noise in the composite sync signal Comp_Sync that could trigger a false vertical sync pulse, the detector could potentially miss a true vertical sync pulse in the Comp_Sync signal. This could be due to a weak composite sync signal Comp_Sync, or "drop out," which occurs when, for one reason or another, one or more vertical sync pulses during a given vertical blanking interval 147 fail to occur or have a low value. Consequently, the present invention employs the vertical sync regenerator 119 (FIG. 2) that compensates for dropout or other times when the vertical sync detector 104 fails to produce an appropriate vertical sync pulse in the vertical sync signal Vert_Sync.

Referring back to FIG. 2, the row pointer 120 essentially has 263 stages representing a full frame. Therefore, when a "high" value pulse is shifted out of the 263rd stage 12_263 of the row pointer 120, a new "high" value pulse should be shifted into the first stage 12_1. Since the frequency of vertical sync pulses derived from the NTSC composite signal NTSC_Comp can vary, additional stages must be added to the row pointer to compensate for such frequency variations. As a result, the row pointer 120 of the present invention adds four carryover stages 12_264 through 12_267 into which the last or previous "high" value pulse from the last stage 12_263 is shifted. If the vertical sync regenerator 119 detects a current "high" value pulse from the first four stages 12_1 through 12_4 of the row pointer 120, before the previous "high" value pulse is shifted from the carryover stage 12_267, then the current pulse is shifted into the fifth stage 12_5 of the row pointer. Otherwise, if a current "high" value pulse is not detected within the first four stages 12_1 through 12_4 of the row pointer 120, then the previous "high" pulse from the previous frame, which is currently stored in the carryover stage 12_267, is input to the fifth stage 12_5 of the row pointer.

Referring to FIGS. 5A through 5F, the operation of the row pointer 120 in conjunction with the vertical sync regenerator 119 are depicted by exemplary waveforms. FIG. 5A shows an example of portions of three consecutive frames of the NTSC composite signal NTSC_Comp. In particular, FIG. 5A shows three consecutive vertical blanking intervals 147, 147' and 147". The first and third vertical blanking intervals 147 and 147" have vertical sync pulse intervals 150 and 150" that have vertical sync pulses 167 and 167", which cause the vertical sync detector 104 to produce vertical sync pulses 172 and 172" (FIG. 5B), all respectively. The second vertical blanking interval 147', however, has a vertical sync pulse interval 150' having vertical sync pulses 166' and 167', which have an amplitude less than that of the vertical sync pulses 166 and 167 and 166" and 167". As a result, the vertical sync pulses 166' and 167' are interpreted as having "low" values by the vertical sync detector 104, and therefore do not produce a vertical sync pulse during the vertical blanking interval 147'. The lack of a vertical sync pulse in the vertical sync signal Vert_Sync of FIG. 5B is indicated by the dashed line pulse 172'.

The vertical sync regenerator 119 of the present invention essentially recycles the single "high" pulse in the row pointer 120 from the previous frame if it fails to detect a vertical sync pulse in the vertical blanking interval for the current frame. Therefore, as shown in FIG. 5B, the vertical sync detector 104 produces a first vertical sync pulse 172 in the vertical sync signal Vert_Sync from the vertical sync pulse 167 during the vertical sync pulse interval 150 (FIG. 5A). The single "high" value vertical sync pulse 172 is shifted through the first four stages 12_1 through 12_4 of the row pointer 120 at a rate based on the clock signal CPp (FIG. 2). Concurrently therewith, the vertical sync pulse from the previous frame, or pulse 180 of FIG. 5, is shifted through the four carryover stages 12_264 through 12_267 of the row pointer 120. The vertical sync regenerator 119 detects the "high" value pulse from the fourth stage 12_4 as a "high" value pulse 174 in a signal "Shift_In" (FIG. 5E). Recognizing the "high" pulse 174 in the Shift_In signal as the vertical sync pulse 172 of the current frame, the vertical sync regenerator 119 shifts out a "high" value pulse 176 as a signal "Shift_Out" (FIG. 5F) to the fifth stage 12_5 of the row pointer 120.

After the next clock pulse, the "high" value pulse 176 shifts from the fifth stage 12_5 to the sixth stage 12_6 of the row pointer 120, and the value of the sixth stage is input back to the vertical sync regenerator 119 as a "high" value pulse 178 in the row pointer signal RP6 (FIG. 5D). The row pointer signal RP6 ensures that only one "high" value pulse is input to the row pointer 120 during each frame, by resetting the vertical sync regenerator 119 until it receives the next "high" vertical sync pulse in the vertical sync signal Vert_Sync (FIG. 5B).

If the vertical sync detector 104 fails to produce a vertical sync pulse, such as the missing pulse 172' in FIG. 5B, then the vertical sync regenerator 119 produces a "low" value in the Shift_In signal from the fourth stage 12_4 of the row pointer 120 (FIG. 5E). As a result, the carryover stage 12_267 outputs a carryover row pointer signal RP267 as a "high" value pulse 180' (FIG. 5C) to the vertical sync regenerator 119. In response thereto, the vertical sync regenerator 119 produces a "high" value pulse 176' in the Shift_Out signal (FIG. 5F).

The vertical sync regenerator 119, in conjunction with the vertical sync detector 104, produces a single "high" value pulse in stages 12_5 through 12_263 of the row pointer 120 for each frame in the NTSC composite signal NTSC_Comp. By simply adding additional stages to the row pointer 120 and providing circuitry for the vertical sync regenerator 119, the present invention is able to generate such a single "high" value signal to the row pointer, based on the NTSC composite signal NTSC_Comp, with a minimal amount of additional circuitry than that required to address and drive the matrix of display cells 118.

Figure 6:
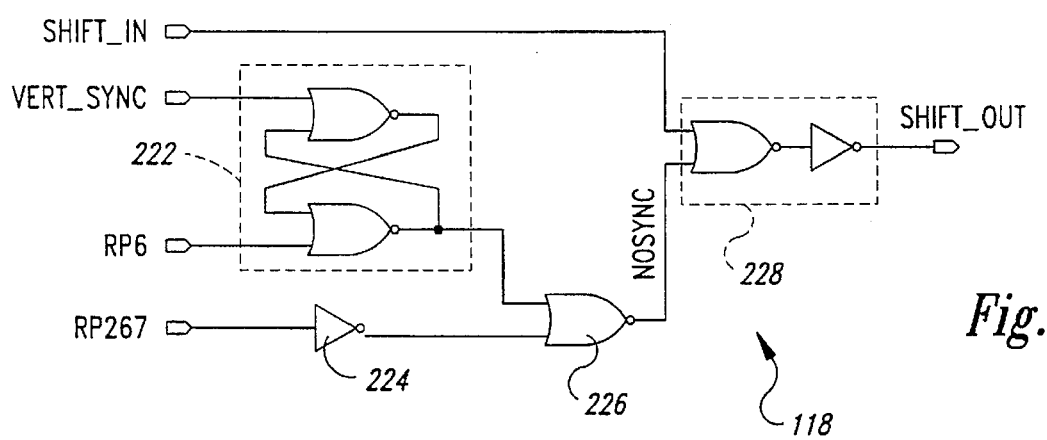
FIG. 6 is a schematic diagram of the vertical sync regenerator of the display device of FIG. 2.

Referring to FIG. 6, a circuit for implementing the vertical sync regenerator 119 is shown as employing a flip-flop or resetting latch 222, consisting of two NOR gates. The latch 222 receives the vertical sync signal Vert_Sync as a "setting" signal, and the row pointer signal RP6 as a "resetting" signal. The output of the latch 222 provides a first input to a two input pass gate, such as a NOR gate 226. The carryover row pointer signal RP267 is inverted by an inverter 224 and input to the second input of the NOR gate 226. An OR gate 228, consisting of a NOR gate followed by an inverter, receives the output from the NOR gate 226, and receives the Shift_In signal from the fourth stage 12_4 of the row pointer 120. The output of the OR gate 228, the Shift_Out signal, is input to the fifth stage 12_5 of the row pointer 120.

The vertical sync regenerator 119, and the vertical sync detector 104 and other circuits herein, employ inverters and NOR gates because the display device 100 is preferably manufactured using conventional NMOS semiconductor manufacturing techniques. Other logic elements and manufacturing techniques can be substituted to perform the goals of the present invention, as is known by those skilled in the relevant art.

In operation, if the vertical sync detector 104 produces a vertical sync pulse as a "high" value pulse, the pulse is shifted out of the fourth stage 12_4 of the row pointer 120 as a "high" value pulse in the "Shift_In" signal to the OR gate 228 of the vertical sync regenerator 119. This "high" value pulse in the "Shift_In" signal is then output from the OR gate 228 as a "high" value pulse in the Shift_Out signal to the fifth stage 12_5 of the row pointer 120. If the Shift_In signal has a "low" value, however, the vertical sync signal Vert_Sync will similarly have a "low" value. If the vertical sync signal Vert_Sync input to the latch 222 has a "low" value at the same time that the carryover row pointer signal RP267 has a "high" value, the NOR gate 226 outputs a high value to the OR gate 228, which is then output as a "high" pulse in the Shift_Out signal to the fifth stage 12_5 of the row pointer 120. In this way, the vertical sync regenerator 119 substitutes the previous vertical sync pulse (i.e., carryover row pointer signal RP267) for the lack of a vertical sync pulse in the current vertical sync signal Vert_Sync.

As can be understood from the above description, the present invention generates a single vertical sync pulse per frame in the composite sync signal Comp_Sync for initiating the row pointer 120 to drive the rows of display cells in the matrix of display cells 118. The present invention provides such a "high" value pulse to the row pointer 120 using a minimum of additional circuitry, in part, because the row pointer includes additional stages 12_264 through 12_267 to produce a vertical sync pulse in the event of drop out or other reasons for lack of a vertical sync pulse in the NTSC composite signal NTSC_Comp. Additionally, the row pointer 120 provides a reset signal as the row pointer signal RP6 to the vertical sync regenerator 119 to ensure that only a single "high" value pulse is input to the row pointer. The vertical sync detector 104 and vertical sync regenerator 119 filter noise from the composite sync signal Comp_Sync, thereby avoiding noise from being confused as a vertical sync pulse, yet is able to create a vertical sync pulse in the presence of drop out or other failures in the NTSC composite signal NTSC_Comp.

U.S. patents and/or applications cited above are hereby incorporated by reference herein as if set forth in their entirety.

While the detailed description above has been expressed, in part, in terms of specific examples, those skilled in the art will appreciate that many other variations could be used to accomplish the purpose of the disclosed invention. Those skilled in the art will recognize that the present invention is usable in numerous applications requiring visual displays, and particularly with field emission displays (FEDs). Accordingly, it can be appreciated that various equivalent modifications of the above-described embodiments may be made without departing from the spirit and scope of the invention. Therefore, the present invention is limited only by the following claims.

I claim:

1. A display system for receiving a picture signal having frames, each frame being composed of a plurality of lines, each line having either video information and a first synchronizing component, or a second synchronizing component, the second synchronizing component occurring at a predetermined time during the line and indicating the beginning of a frame, the display system comprising:

a matrix of display cells arranged in an array having a plurality of rows and at least one column, the display cells being individually addressable by row signals to receive the video information in the picture signal in response thereto;

a pointer device providing the row signals in response to a data signal, generating a start pointer signal at the predetermined time during each line, and providing a carryover pointer signal indicating the beginning of a previous frame;

a synchronizing detector having a memory circuit and an analysis circuit, the memory circuit being coupled to the pointer device and receiving the picture signal and storing a plurality of samples of each line of the picture signal after receiving the start pointer signal, the samples of each line containing one of the video information and the second synchronizing component, the samples of the second synchronizing component having a predetermined value, and the analysis circuit being coupled to the memory circuit and outputting the samples of the picture signal as the second synchronizing component if the samples have substantially the same predetermined value; and a synchronizing regenerator circuit coupled to the synchronizing detector and pointer device and receiving the second synchronizing component and outputting a current second synchronizing component as the data signal to the pointer device if a current frame contains the current second synchronizing component, or outputting the carryover pointer signal as a substitute data signal if the current frame fails to contain the current second synchronizing component.

2. The display system of claim 1 wherein the memory circuit of the synchronizing detector includes a clock circuit coupled to the pointer device that produces shift pulses in response to the pointer signal, and a three stage shift circuit coupled to the clock circuit that serially shifts therethrough sequential samples of the picture signal in response to the shift pulses.

3. The display system of claim 1 wherein the analysis circuit of the synchronizing detector includes a pass gate coupled to the memory circuit that outputs the second synchronizing component if all of the plurality of samples have the predetermined value.

4. The display system of claim 1 wherein the pointer device provides an inhibit pointer signal, and wherein the synchronizing detector includes a latch and a pass gate, the latch receiving the picture signal and producing a set signal in response to the current second synchronizing component, and being coupled to the pointer device to receive the inhibit pointer signal and produce a reset signal in response thereto, the pass gate being coupled to the latch and receiving the set and reset signals therefrom, and being coupled to the pointer device to receive the carryover pointer signal, the pass gate providing the carryover pointer signal as the substitute data signal when failing to receive the set signal.

5. The display system of claim 1, further comprising a first clock circuit that receives the second synchronizing component and produces a second clocking signal in response thereto;

wherein the matrix of display cells includes a plurality of columns of display cells; and wherein the pointer device includes first and second pointer circuits, the second pointer circuit being coupled to the first clock circuit and providing the column signals in response to the second clocking signal and providing the start pointer signal, and the first pointer circuit providing the row signals and the carryover pointer signal.

6. The display system of claim 5 wherein the first pointer circuit provides the row signals in response to a first clocking signal, wherein the second pointer circuit is coupled to the first pointer circuit and provides a last pointer signal thereto, the last pointer signal being the first clocking signal for the first pointer circuit, and wherein the first and second pointer circuits are shift circuits.

7. The display system of claim 5 wherein the second pointer circuit provides a last pointer signal, and wherein the first clock circuit is a phase locked loop comprising:

an oscillator coupled to the second pointer circuit that provides the second clock signal in response to an error signal; and a comparator coupled to the synchronizing detector and the second pointer circuit and comparing the first clock signal to the last pointer signal to produce the error signal.

8. The display system of claim 1 wherein the matrix of display cells is a matrix of field emission devices.

9. The display system of claim 1 wherein the matrix of display cells, pointer device, the synchronizing detector and the synchronizing regenerator circuit are monolithically integrated.

10. The display system of claim 1, further comprising a sync separator circuit receiving the picture signal and coupled to the synchronizing detector and the matrix of display cells, the sync separator circuit separating the first and second synchronizing components from the video information in the picture signal for the synchronizing detector.

11. The display system of claim 1 wherein the picture signal is an NTSC signal having frames of horizontal lines, each line having either video information and a horizontal synchronizing component having a first frequency as the first synchronizing component, or a vertical synchronism component having a second frequency as the second synchronizing component, wherein the pointer device provides the start pointer signal to the synchronizing detector at a rate approximately equal to the first frequency and at a time approximately three-quarters into each horizontal line, and wherein the synchronizing detector provides the vertical synchronizing component as the data signal by storing if the plurality of samples are substantially similar.

12. In a picture signal having frames, each frame being composed of a plurality of lines, each line having either video information and horizontal synchronizing components, or vertical synchronizing components, each vertical synchronizing component indicating the beginning of a frame, a circuit for producing vertical synchronizing components when a frame fails to contain the vertical synchronizing component comprising:

a pointer circuit that stores a carryover pointer signal indicating the beginning of a previous frame, and wherein the pointer circuit provides an inhibit pointer signal;

a selection circuit coupled to the pointer circuit and providing a current vertical synchronizing component if the frame contains the current vertical synchronizing component, or providing the carryover pointer signal as a replacement vertical synchronizing component if the current frame fails to contain the current vertical synchronizing component; and wherein the selection circuit includes a latch and a pass gate, the latch receiving the picture signal and producing a set signal in response to the current vertical synchronizing component, and being coupled to the pointer circuit to receive the inhibit pointer signal and produce a reset signal in response thereto, the pass gate being coupled to the latch and receiving the set and reset signals therefrom, and being coupled to the pointer circuit to receive the carryover pointer signal, the pass gate providing the replacement vertical synchronizing component as the current vertical synchronizing component when failing to receive the set signal.

13. A display apparatus for receiving a television signal having frames of video information and corresponding first and second synchronizing components comprising:

a semiconductor substrate;

a matrix of field emission display cells formed on the semiconductor substrate arranged in an array of M rows by N columns, the field emission display cells being individually addressable by M number of row signals and N number of column signals to selectively receive the video information of the television signal in response thereto;

a first and second pointer circuits formed on the semiconductor substrate, the first pointer circuit sequentially providing the M row signals and a previous data signal for a previous frame of video information in the television signal in response to a first clocking signal and a data signal, and the second pointer circuit sequentially providing the N column signals in response to a second clocking signal, the second clocking signal having a second frequency higher than a first frequency of the first clocking signal;

a first clock circuit formed on the semiconductor substrate and coupled to the second pointer circuit and receiving the first synchronizing component of the television signal and producing the second clocking signal in response thereto;

a synchronizing detector circuit formed on the semiconductor substrate and coupled to the first pointer circuit, the synchronizing detector receiving the second synchronizing component of the television signal for a current frame of video information and produces the data signal in response thereto; and a synchronizing regenerator circuit formed on the semiconductor substrate and coupled to the synchronizing detector and first pointer circuits, the synchronizing regenerator circuit providing a substitute data signal if the synchronizing regenerator circuit fails to receive the data signal, the substitute data signal being based on the previous data signal.

14. The display apparatus of claim 13 wherein the second pointer circuit provides a first pointer signal to the synchronizing detector circuit at a rate approximately equal to the first frequency, and wherein the synchronizing detector circuit analyzes a plurality of samples of the picture signal to detect for the second synchronizing component and provides the second synchronizing component as the data signal if the second synchronizing component is detected.

15. The display apparatus of claim 13 wherein the second pointer circuit provides a first pointer signal to the synchronizing detector circuit at a rate approximately equal to the first frequency, wherein the synchronizing detector circuit, after receiving the first pointer signal, analyzes a plurality of samples of the television signal to detect for the second synchronizing component, and provides the second synchronizing component as the data signal if the second synchronizing component is detected; and wherein the synchronizing detector circuit includes a start circuit, a storage device and a pass gate, the start circuit being coupled to the second pointer circuit, receiving the first pointer signal and producing an enable signal for the storage device, the storage device storing a plurality of samples of the picture signal in response to the enable signal, and the pass gate being coupled to the storage device and outputting the second synchronizing component as the data signal if the plurality of samples have a predetermined value.

16. The display apparatus of claim 13 wherein the start circuit is a second clock circuit that produces shift pulses, and wherein the storage device is a three stage shift register coupled to the second clock circuit that serially shifts sequential samples of the television signal in response to the shift pulses.

17. The display apparatus of claim 13 wherein the first pointer circuit provides a first pointer signal and a carryover pointer signal to the synchronizing regenerator circuit, and wherein the synchronizing regenerator circuit provides the data signal to the first pointer circuit if the synchronizing regenerator circuit receives the first pointer signal, and provides the carryover pointer signal as the substitute data signal if the synchronizing regenerator circuit fails to receive the data signal from the synchronizing detector circuit.

18. The display apparatus of claim 13 wherein the first pointer circuit provides a first pointer signal and a carryover pointer signal to the synchronizing regenerator circuit, wherein the synchronizing regenerator circuit provides the data signal to the first pointer circuit if the synchronizing regenerator circuit receives the first pointer signal, and provides the carryover pointer signal as the substitute data signal if the synchronizing regenerator circuit fails to receive the data signal from the synchronizing detector circuit, and wherein the synchronizing regenerator circuit includes a latch and a pass gate, the latch being coupled to the synchronizing detector circuit to receive the data signal and produce a set signal in response thereto, and being coupled to the first pointer circuit to receive a second pointer signal and produce a reset signal in response thereto, the pass gate being coupled to the latch and receiving the set and reset signals therefrom, and being coupled to the first pointer circuit to receive the carryover pointer signal, the pass gate providing the substitute data signal as the carryover pointer signal when failing to receive the set signal.

19. A method of displaying information based on a picture signal having frames composed of a plurality of lines, each line having either video information and a first synchronizing component, or second synchronizing component, the second synchronizing component occurring at a predetermined time during the line and indicating the beginning of a frame, the method comprising the steps of:

providing a matrix of display cells arranged in an array having a plurality of rows and a plurality of columns, the display cells being individually addressable by row and column signals so as to receive the video information in the picture signal in response thereto;

providing a row pointer device;

producing a first and second clocking signal in response to the first synchronizing component, the second clocking signal having a frequency greater than a frequency of the first clocking signal;

detecting the second synchronism component in the picture signal;

producing a data signal based on the second synchronizing component;

providing a current frame of video information to the matrix of display cells;

receiving the data signal;

producing the row signals from the pointer device at a rate equal to the frequency of the first clocking signal to sequentially enable rows of display cells in the matrix of display cells after receiving the data signal;

producing a substitute data signal based on a second synchronizing component from the pointer device based on a previous frame of video information if the data signal is not received; and producing the column signals at a rate equal to the first clocking signal to sequentially enable display cells in a given row to display information based on the video signal.

20. The method of claim 19 wherein the step of providing a matrix of display cells provides a matrix of field emission devices.

21. The method of claim 19 wherein the step of producing the data signal includes the steps of:

providing a start pointer signal at a rate approximately equal to the first clocking frequency and at the predetermined time during each line, analyzing a plurality of samples of the picture signal after receiving the start pointer signal, detecting for the second synchronizing component in the plurality of samples, and providing the second synchronizing component as the data signal if the second synchronizing component is detected.

22. The method of claim 19 wherein the step of producing a substitute data signal includes the steps of:

providing a carryover pointer signal, detecting for a first pointer signal as the data signal, and providing the carryover pointer signal as the substitute data signal if the first pointer signal is not detected.

23. A television for receiving a picture signal having frames, each frame being composed of a plurality of lines, each line having either video information and a first synchronizing component, or a second synchronizing component, the second synchronizing component occurring at a predetermined time during the line and indicating the beginning of a frame, the television comprising:

a receiver that receives the picture signal;

a matrix of display cells coupled to the receiver and arranged in an array having a plurality of rows and a plurality of columns, the display cells being individually addressable by row and column signals to receive the video information in the picture signal in response thereto;

a pointer device providing the row signals in response to a data signal, generating a start pointer signal at the predetermined time during each line, and storing a carryover pointer signal indicating the beginning of a previous frame;

a synchronizing detector having a memory circuit and an analysis circuit, the memory circuit being coupled to the pointer device and receiving the picture signal and storing a plurality of samples of each line of the picture signal after receiving the start pointer signal, the samples of each line containing one of the video information and the second synchronizing component, the samples of the second synchronizing component having a predetermined value, and the analysis circuit being coupled to the memory circuit and outputting the samples of the picture signal as the second synchronizing component if the samples have substantially the same predetermined value; and a synchronizing regenerator circuit coupled to the synchronizing detector and pointer device and receiving the second synchronizing component and outputting a current second synchronizing component as the data signal to the first pointer device if a current frame contains the current second synchronizing component, or outputting the carryover pointer signal as a substitute data signal if the current frame fails to contain the current second synchronizing component.

24. A computer for displaying a picture signal having frames of video information and corresponding synchronism components comprising:

a central processing unit that produces the picture signal;

a memory coupled to the central processing unit;

an input device for inputting commands to the central processing unit;

a matrix of display cells coupled to the central processing unit and arranged in an array having a plurality of rows and a plurality of columns, the display cells being individually addressable by row and column signals to receive the video information in the picture signal in response thereto;

a first pointer circuit coupled to the matrix of display cells, the first pointer circuit providing the row signals and a previous data signal for a previous frame of video information in response to a first clocking signal;

a second pointer circuit, coupled to the matrix of display cells, the second pointer circuit providing the column signals in response to a second clocking signal, the second clocking signal having a second frequency higher than a first frequency of the first clocking signal;

a first clock circuit coupled to the second pointer circuit that receives the synchronizing component and produces the second clocking signal in response thereto;

a synchronizing detector circuit coupled to the first pointer circuit that receives the synchronizing component of the picture signal and produces the data signal in response thereto; and a synchronizing regenerator circuit coupled to the synchronizing detector and first pointer circuits and providing a substitute data signal if the synchronizing regenerator circuit fails to receive the data signal, the substitute data signal being based on the previous data signal.

* * * * *

UNITED STATES PATENT AND TRADEMARK OFFICE
CERTIFICATE OF CORRECTION

PATENT NO. : 5,635,988
DATED : June 3, 1997
INVENTOR(S) : Glen E. Hush

It is certified that error appears in the above-identified patent and that said Letters Patent is hereby corrected as shown below:

In column 15, claim 9, line 30, preceding "pointer" please insert --the--.

In column 17, claim 16, line 20, please delete "13" and insert therefor --15--.

Signed and Sealed this

Third Day of February, 1998

Attest:

BRUCE LEHMAN

Attesting Officer

Commissioner of Patents and Trademarks